United States Patent [19]

Banh et al.

[11] Patent Number: 5,150,426
[45] Date of Patent: Sep. 22, 1992

[54] MOVING TARGET DETECTION METHOD USING TWO-FRAME SUBTRACTION AND A TWO QUADRANT MULTIPLIER

[75] Inventors: Nam D. Banh, Canoga Park; Thomas K. Lo, Temple City; Kelly D. Holthaus, Chatsworth; Jack M. Sacks, Thousand Oaks, all of Calif.

[73] Assignee: Hughes Aircraft Company, Los Angeles, Calif.

[21] Appl. No.: 616,267

[22] Filed: Nov. 20, 1990

[51] Int. Cl.⁵ .......................... G06K 9/20; G06K 9/00; H04N 7/18; G01S 13/00
[52] U.S. Cl. .......................................... 382/48; 382/1; 342/90; 342/97; 342/160; 358/105
[58] Field of Search ................... 382/1, 44, 34, 45, 41, 382/48; 342/90, 94–97, 160–162; 358/105, 125, 126, 135, 136

[56] References Cited

U.S. PATENT DOCUMENTS

| | | | |
|---|---|---|---|
| 4,003,052 | 1/1977 | Adelman et al. | 342/162 |
| 4,603,430 | 7/1986 | Sacks | 382/41 |
| 4,644,582 | 2/1987 | Morishita et al. | 382/44 |
| 4,685,146 | 8/1987 | Fenster et al. | 382/44 |
| 4,688,044 | 8/1987 | O'Brien | 342/160 |
| 4,739,401 | 4/1988 | Sacks et al. | 358/105 |
| 4,937,878 | 6/1990 | Lo et al. | 382/1 |
| 4,975,864 | 12/1990 | Sendall et al. | 382/50 |

*Primary Examiner*—David K. Moore
*Assistant Examiner*—Michael R. Cammarata
*Attorney, Agent, or Firm*—C. D. Brown; R. M. Heald; W. K. Denson-Low

[57] ABSTRACT

A method and apparatus for detecting an object of interest against a cluttered background scene. In a first preferred embodiment the sensor tracking the scene is movable on a platform such that each frame of the video representation of the scene is aligned, i.e., appears at the same place in sensor coordinates. A current video frame of the scene is stored in a first frame storage device (14) and a previous video frame of the scene is stored in a second frame storage device (20). The frames are then subtracted by means of an invertor (24) and a frame adder (28) to remove most of the background clutter. The subtracted image is put through a first leakage reducing filter, preferably a minimum difference processor filter (32). The current video frame in the first frame storage device (14) is put through a second leakage-reducing filter, preferably minimum difference processor filter (36). The outputs of the two processors are applied to a two quadrant multiplier (42) to minimize the remaining background clutter leakage and to isolate the moving object of interest. In a second preferred embodiment the sensor does not track the scene and therefore the frames of video from the two storage devices (140, 200) must be aligned before the subtraction process can occur. The alignment function is performed by a background registration correlator (150) and a frame shifter (130). Once the two frames of video data are aligned they are then subtracted and preferably applied to the minimum difference processor filters (320, 360) as with the first embodiment. The outputs of the two minimum difference processors (320, 360) are again applied to a two quadrant multiplier (420) to eliminate the remaining background clutter.

24 Claims, 3 Drawing Sheets

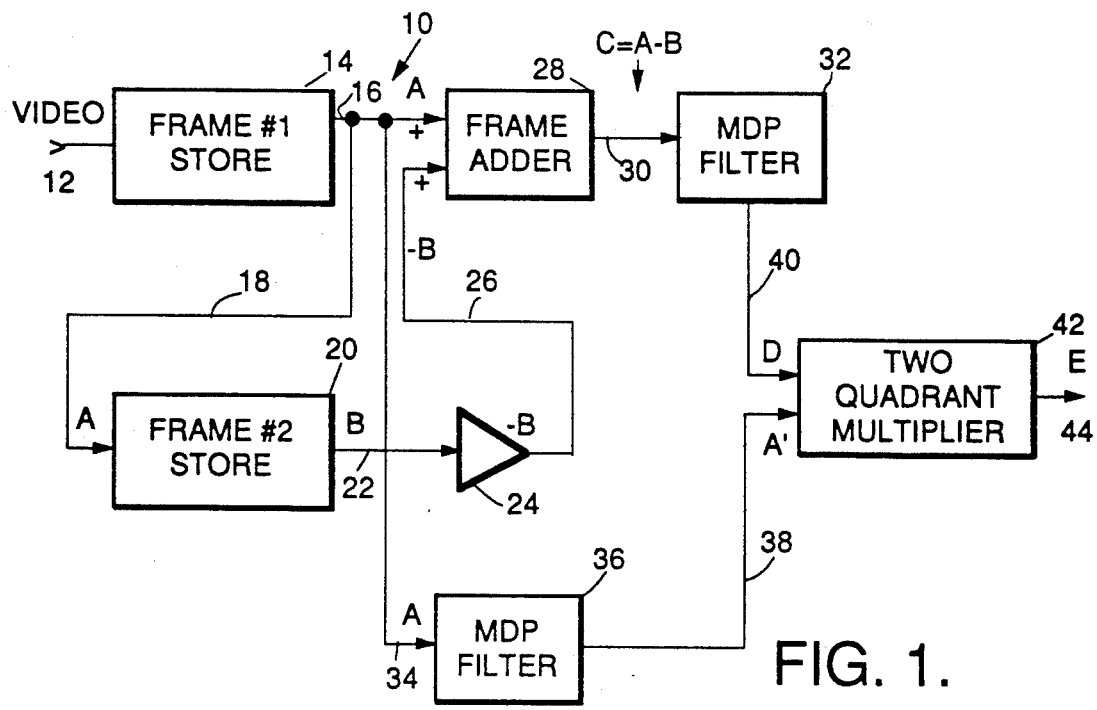
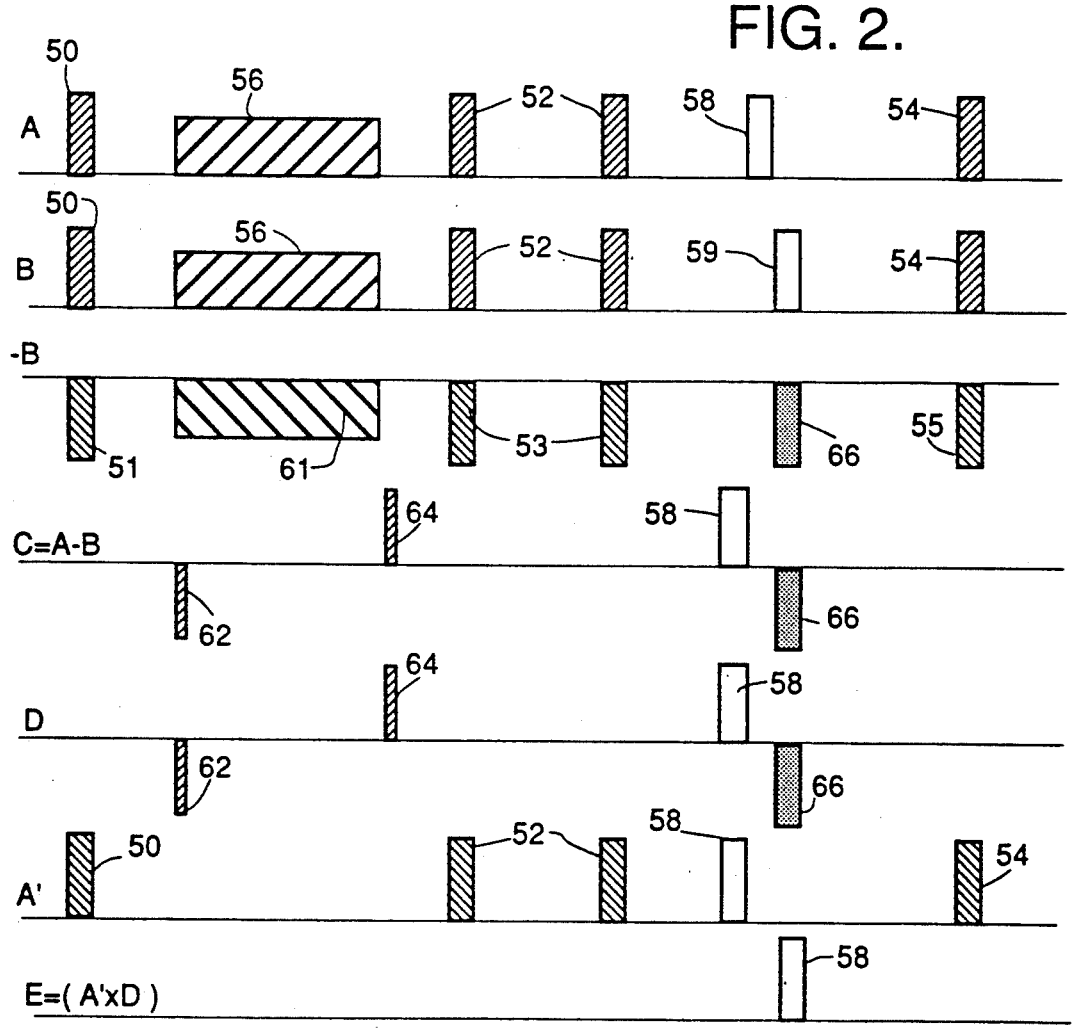
FIG. 1.
FIG. 2.

MOVING TARGET DETECTION METHOD USING TWO-FRAME SUBTRACTION AND A TWO QUADRANT MULTIPLIER

BACKGROUND OF THE INVENTION

1. Technical Field

This invention relates to a method and apparatus for detecting a moving target and, more specifically, to a method and apparatus for detecting a moving target within a cluttered background.

2. Discussion

In certain image processing systems it is necessary to acquire a target which is moving against a cluttered background. In particular, certain applications require that the target must be detected and acquired autonomously. Typically the requirements on such acquisition systems are such that the probability of a missed detection or a false detection is extremely low. The satisfaction of these performance requirements implies a reasonably high signal to noise ratio and a method to substantially suppress the background clutter. The present invention primarily addresses methods of clutter suppression.

One method of detecting a moving object and isolating it from background clutter is disclosed in U.S. patent application, Ser. No. 07/229,390, (now U.S. Pat. No. 4,937,878) filed 8/8/88 herein incorporated by reference. That application discloses an image processing acquisition system in which an image of the object is generated by first generating a difference between a current image frame and an image frame taken at a previous time, and second, generating a difference between the current image frame and another previous image frame. This subtraction procedure eliminates some of the background clutter since the background scene of the three image frames is nearly the same. The two difference image frames are then logically ANDed such that only the current position of the object of interest is detected.

A second method of detecting a moving object within a scene having background clutter is disclosed in U.S. patent application Ser. No. 07/229,196, herein incorporated by reference. In that application, the image frames, including the object of interest, of three consecutively taken images are correlated together. A median value for each pixel position of the correlated image frames is then selected, and each median pixel value is subtracted from the pixel value of one of the image frames to form a difference image. A threshold intensity value is determined for each pixel position. The threshold intensity values are then applied to the difference image such that the pixels exceeding the threshold value are associated with the object of interest.

Although these two systems described above have met with favorable success, there is still room for improving the performance of these types of acquisition systems. It is therefore an object of this invention to provide a moving target detection method and apparatus incorporating an increase in performance and accuracy over the above-described systems, and further, decrease the acquisition time, utilize less hardware, and reduce the amount of clutter leakage.

SUMMARY OF THE INVENTION

This invention discloses a novel method and apparatus for detecting moving objects within a scene by substantially reducing or eliminating the stationary objects which represent background clutter in the scene. The reduction in hardware and time of acquisition over the prior art methods is achieved by the use of only a single subtraction of two registered frames of video data. The ability to separate the object of interest from the background clutter by a single subtraction of two registered frames is realized by the combination of scene subtraction and filtering by a minimum difference processor (MDP) filter. An MDP filter, is disclosed in U.S. patent application Ser. No. 07/673,618, filed Mar. 22, 1991, herein incorporated by reference. By this combination, the background clutter leakage which is left from the subtraction process is substantially eliminated by the MDP filter.

In a first preferred embodiment, the scene is tracked and therefore has nominally a zero line of sight rate. From the tracked scene, a single frame of video data is stored in a first storage device. At a predetermined time afterwards, a second, more current, video image is stored in the first storage device and the video frame which was in the first storage device is transferred to a second storage device. The two video images from the two frame storage devices are then subtracted to eliminate most of the background clutter, and the difference image is used as an input to an MDP filter to create a filtered difference output. In addition, the most current video image in the first storage device is applied to a second MDP filter to create a filtered image. The outputs from the MDP filters are then applied to a two quadrant multiplier to remove the redundant image of the object of interest.

A second preferred embodiment provides a detection method using a two frame subtraction technique as above without the requirement that the background scene remain substantially stationary in the particular field of view. In this embodiment, consecutive video images are first stored in first and second storage devices as described above for the first preferred embodiment, but further, a background registration correlator is included to measure the displacement of the background image in the second storage device relative to the background image in the first storage device. The amount of displacement of the image in the second storage device is then shifted so the image stored in the second storage device is aligned with the image stored in the first storage device. The aligned image from the frame shifter is subtracted from the current image stored in the first storage device as in the first embodiment above. Further, an MDP filter is applied to the video image from the subtraction process to produce a filtered difference image. As in the first preferred embodiment, a filtered image is also produced by applying an MDP filter to the most current video image. Once again the outputs from the MDP filters are applied to a two quadrant multiplier to eliminate the redundant image of the object of interest.

Additional objects, advantages, and features of the present invention will become apparent from the following description and appended claims, taken in conjunction with the accompanying drawings.

BRIEF DESCRIPTION OF THE DRAWINGS

FIG. 1 is a functional block diagram of a first preferred embodiment of the present invention;

FIG. 2 is a signal diagram of certain points taken from the block diagram of the first preferred embodiment of FIG. 1;

DETAILED DESCRIPTION OF THE PREFERRED EMBODIMENTS

Figure 3:
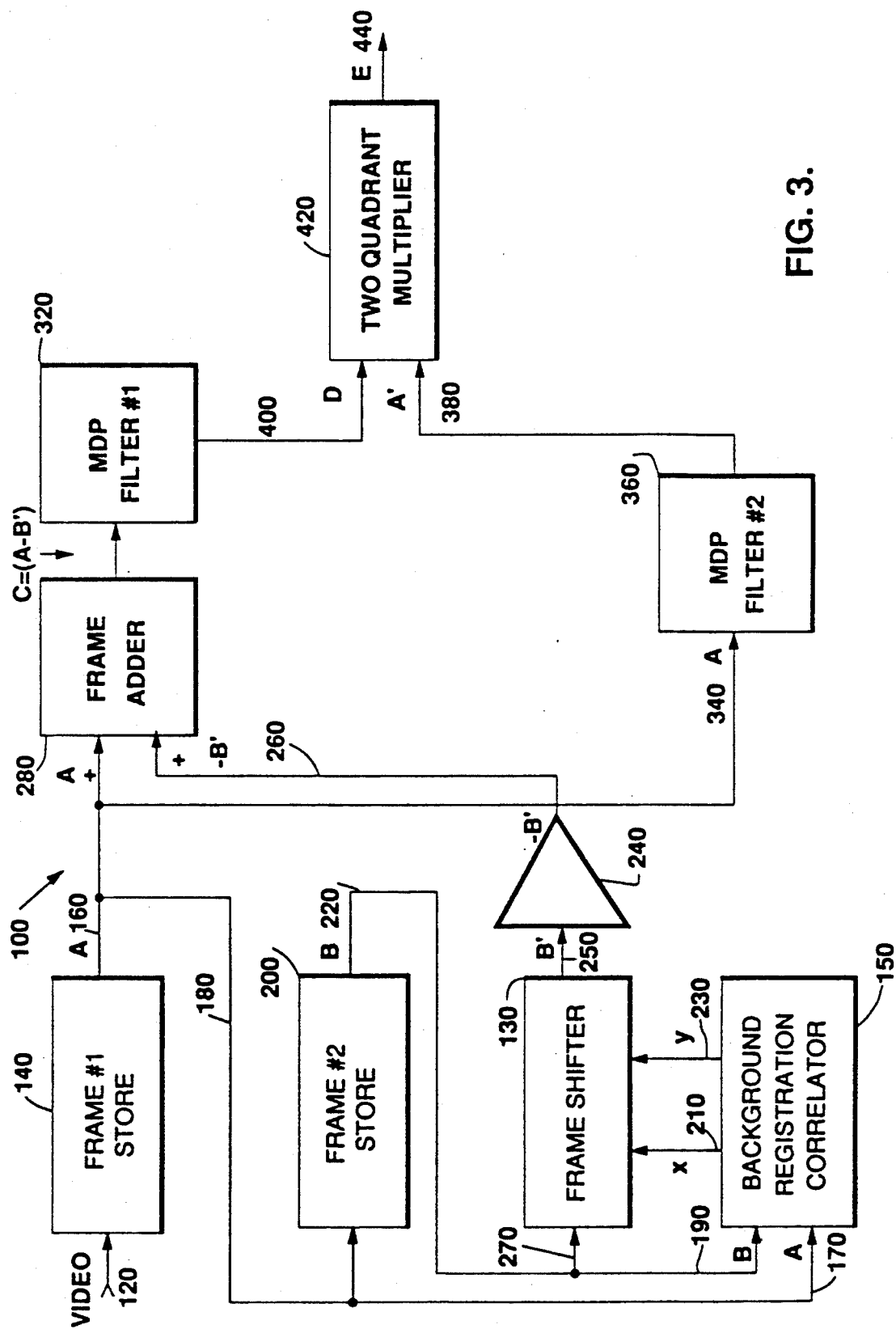
FIG. 3 is a functional block diagram of a second preferred embodiment of the present invention.

The following descriptions of the preferred embodiments are merely exemplary in nature and are in no way intended to limit the invention or its applications or uses.

Separating a moving target from a scene having a cluttered background is a crucial aspect of target acquisition devices. As discussed above, it is difficult and complex to design a target acquisition system for acquiring moving targets through these scenes which has a low number of false detections as well as a low number of missed detections. This invention discloses two preferred embodiments of moving target detection systems having very high target detection efficiency.

Each of the preferred embodiments requires only two frames of video data to detect the moving target against a cluttered background scene. This is a significant improvement over prior art tracking systems which required three frames to isolate a moving target and eliminate ambiguity arising from the target image stored in the previous frames. Therefore the usage of this invention substantially reduces the time required for detection and saves buffer memory. In addition, there is a substantial reduction in clutter leakage.

A first preferred embodiment, shown as a functional block diagram in FIG. 1, utilizes a sensor (not shown) which accurately tracks a particular scene. What is meant by tracking a scene is that the scene has a zero line of sight rate with respect to the sensor. In other words, the sensor is mounted on a particular platform, i.e. a missile, and is movable on that platform such that it will be moved at a rate and direction so that the scene appears stationary over a sequence of images sensed by the sensor. Therefore, as the tracking system focuses on a particular scene over a sequence of images, the object of interest will move through the scene and be at different locations while the stationary background images will be aligned.

Returning to FIG. 1, the first embodiment of the acquisition system is generally shown at 10. A video input signal of a particular scene is sent along line 12 by means well known to those skilled in the art. Line 12 acts as an input for a frame storage device 14. Typically, frame storage device 14 is a bank of random access memory (RAM). An output of frame storage device 14 is taken on line 16 and applied to a frame adder 28. A second line 18 is also taken from the output of frame storage device 14 and applied to a second frame storage device 20 (also a bank of RAM) as an input. A line 22 is taken as an output from frame storage device 20 and applied to an invertor 24 as an input. The inverted signal from line 22 is applied to frame adder 28 along line 26. Frame adder 28 has an output on line 30 which is applied to a minimum difference processor filter 32.

An output of minimum difference processor (MDP) filter 32 is taken on line 40 and applied as an input to a two quadrant multiplier 42. A third output of frame storage device 14 taken along line 34 is applied to another minimum difference processor (MDP) filter 36. Minimum difference processor filter 36 has an output on line 38 which is also applied to the two quadrant multiplier 42. An output of acquisition system 10 is taken from quadrant multiplier 42 on line 44 and can be applied to a threshold detector (not shown) to sense the presence of a moving object in the present image.

In operation, a video signal representing a single image frame of a scene is accumulated and stored in frame storage device 14 from line 12. The contents of frame storage device 14 represents current data, or the real time acquisition of the scene of interest. After a single frame of video data is accumulated and stored in frame storage device 14 it is transferred along output line 16 to line 18 and is stored in frame storage device 20. As the image is being transferred from storage device 14 to storage device 20 a new, more current, frame of video data is being applied to frame storage device 14 along line 12. The interval of time between the accumulation of a single frame of video in frame storage device 14 and the output of this single frame to frame storage device 20 is predetermined, and is set at a sufficient time to allow a moving object within the scene to be detected by the sensor. In other words, an estimate of the speed of the object of interest must be determined so that the detection of the object can take place relative to the minimum amount of movement of the object. The means to set the time of transfer from frame storage device 14 to frame storage device 20 is incorporated prior to video data line 12 and is not shown. The amount of movement the object must sustain to be detectable as a movable target against the cluttered background is the resolution of the sensor. After the accumulated time has elapsed, a new single frame of video is accumulated and stored in frame storage device 14 and the previous current video frame is stored in frame storage device 20. This process of accumulation and transfer of the video data continues at regular predetermined time intervals as described above.

To detect the target of interest within the cluttered scene, the frame stored in frame storage device 20 is subtracted from the frame stored in frame storage device 14. Since the scene is moving at a zero line of sight rate with respect to the sensor, the background scene of the video image in frame storage device 14 and the background scene of the video image stored in frame storage device 20 is virtually the same. Therefore, the difference between these two frames should substantially or entirely eliminate the background clutter. And since the object of interest has moved from the position it was in at the time the video data was stored in frame storage device 14 as compared with the position the object was in when stored in frame storage device 20, the subtraction of the two frames will provide two separate signals for a single object of interest.

To perform the subtraction process, the output of frame storage device 14 on line 16 is applied to frame adder 28. In addition, the output of frame storage device 20 on line 22 is applied to invertor 24 which inverts the video signal on line 26. This inverted video signal from frame storage device 20 is applied to frame adder 28 along with the output on line 16. The addition in frame adder 28 of these two outputs provides a difference of the two video signals on line 30.

If the tracking of the scene is perfect so that the line of sight rate is zero, it is not necessary to perform any type of scene registration or alignment prior to the subtraction process. Further, accurate tracking and scene subtraction eliminates fixed pattern noise. Therefore, the image on line 30 will be free of any background clutter and fixed pattern noise. Fixed pattern noise represents minor defects within the sensor which occur as noise signals in the video frames. However, in practice the tracking of the scene will not be perfect and thus a certain amount of background clutter will survive the subtraction process as background leakage.

The remaining background leakage which survives the subtraction process is substantially removed by MDP filter 32. An MDP filter is a spatial filter which suppresses the amplitude of objects with sizes greater than that of the object of interest. The amplitude need only be greater than the target of interest in a single dimension. The MDP filter generally consists of four interconnected linear antimedian filters oriented at 45 degrees with respect to each other, however, other configurations of antimedian filters can be used to achieve similar results. The output from each of the antimedian filters which has a value closest to zero is selected as the output of the MDP. The output of MDP filter 32 on line 40 therefore ideally includes only the objects which are moving within the reference frame of the subtracted image. The output of frame storage device 14 on line 16 is also applied to an MDP filter 36 on line 34. MDP filter 36 attenuates or eliminates the background clutter objects of the current frame of video which are larger than those target objects of interest, but does not eliminate the fixed pattern noise. The output of MDP 36 is on line 38 which is also applied to the two quadrant multiplier 42.

A two quadrant multiplier has the property, well known to those skilled in the art, that its output is zero when the polarity of its inputs, i.e., on lines 38 and 40, are not the same. This relationship can be visualized by FIG. 5 in which only the shaded portions of quadrants 1 and 3 provide a non-zero output. When the inputs on lines 38 and 40 are the same in position and polarity, the output magnitude of the two quadrant multiplier 42 on line 44 is the product of the inputs, and the output polarity is the same as the polarities of the inputs on lines 38 and 40. Therefore, the ambiguous moving object signals in the difference image are effectively eliminated by the multiplication process. To conserve the dynamic range of acquisition system 10, it is desirable to extract the square root of the magnitude of the product of the output of the two quadrant multiplier 42 on line 44 in order to compute the geometric means.

The output of system 10 on line 44 therefore should be a substantially clean image of the moving target of interest, and can then be applied to other system components. The acquisition of the object of interest is therefore accurately and effectively attained.

FIG. 2 shows simple signal representations of video data which may exist at certain points within system 10. This signal diagram gives a better understanding of the method in which system 10 removes the background clutter from the scene and isolates the moving target of interest. Each video data line of FIG. 2 includes a letter representation of the video signal as shown at certain points in the block diagram of FIG. 1. The first video data line A is the accumulated frame of the most current video image at the output of frame storage device 14 on line 16. As can be seen, this image includes a background signal 56, fixed pattern noise signals 50, 52 and 54 and a target signal 58.

Video data line B represents the previous frame of video data stored in frame storage device 20 as outputted on line 22. Video line B includes identical fixed pattern noise signals 50, 52, and 54 as with video line A, but has background signal 60 substantially identical to background signal 56 with a slight offset due to slightly inaccurate scene tracking. If the sensor had perfect zero line alignment the frames of video data represented by lines A and B would be accurately aligned and therefore background signals 56 and 60 would be aligned. Video line B also includes the signal representative of the silhouetted target of interest 59. Silhouetted target image 59 represents the previous position of the target. The resolution of the system 10 would be affected if the target signals substantially overlapped in position. Video data line -B represents the direct inverse of video data line B taken from line 26. Video line -B includes fixed pattern noise signals 51, 53 and 55 which are direct inverses of fixed pattern noise signals 50, 52 and 54, respectively, and further, background signal 61 which is the direct inverse of background signal 60. In addition, signal 66 is the inverse of target silhouette signal 59.

Video data line C represents the difference between signals A and B as represented on the output of frame adder 28 on line 30. Video data line C includes background leakage 62 and 64 because of the misalignment of background signals 56 and 60. Further, video data line C includes the most current video representation of the object of interest 58 from video line A, and the inverse of the previous image of the video signal of interest at position 66 from video line -B.

Video data line D includes the positive value of the current video signal of the object of interest 58 and the inverse of the previous position of the object of interest 66. The clutter leakage represented by 62 and 64 would manifest themselves as curvilinear elements in a two-dimensional space and would be filtered and eliminated by the MDP. In the one-dimensional example shown in FIG. 1, clutter leakage elements 62 and 64 will be spatially small (smaller than the object of interest) and will be passed intact by the MDP.

Video data line A', taken at line 38 of the output of MDP filter 36, is the filtered data from line A. This filtered data eliminates the video images of the background clutter which are larger than the object of interest 58. Thus, background signal 56 has been filtered out. However, the fixed pattern noise signals 50, 52 and 54 will not be filtered.

Video data line E represents the multiplication of the video data from line A' and the video data from line D on line 44 of FIG. 1. Since the two quadrant multiplier 42 only passes correlated image terms between the images on line D and on line A', only the video data with mutual positive or negative signals are passed to line 44. Therefore, only the object of interest 58 is on line 44. In particular, the clutter leakage elements 62 and 64 in line D have been removed by virtue of their absence in line A'. The ambiguous image of the target 66, in line D is also removed due to its absence in line A'. It should be understood that multiple targets of interest can be isolated at the same time by the same process.

FIG. 3 is a functional block diagram of a second preferred embodiment of the present invention. In this embodiment means are provided for aligning a first stored frame of video data and a second stored frame of video data which has been stored prior to the first frame. By incorporating this feature, the requirement to track the imagery is effectively eliminated. The preferred means for aligning the two frames of data is a correlation device whose purpose is to measure the spatial coordinate differences between the two image frames and generate therefrom a signal indicative of the coordinates between the two frames.

In this second embodiment, devices having the same function as that of the first embodiment of FIG. 1 are indicated generally by the identical reference numeral followed by a zero. The new elements include a frame shifter 130 and a background registration correlator 150. Instead of applying the output from frame storage device 200 directly to frame adder 280, the output on line 220 is first applied to frame shifter 130 on input line 270, and background registration correlator 150 on input line 190. In addition, the output of frame storage device 140 is applied to background registration correlator 150 on input line 170. Background registration correlator 150 has an X and Y output on lines 210 and 230, respectively which are applied as additional inputs to frame shifter 130. The output of frame shifter 130 on line 250 is applied to invertor 240. The output of invertor 240 is applied to frame adder 280 on input line 260. The remaining system components of detection system 100 are identical to those of the first embodiment represented at FIG. 1.

In operation of the second embodiment, the current video image which is stored in frame storage device 140 is not necessarily aligned with the previous image which is stored in frame storage device 200 as was the case with the first embodiment. The scene is not tracked, therefore the frames are not registered, and thus, the stationary background images are offset from one frame to the next. The outputs of frame storage device 140 and frame storage device 200 are therefore applied as inputs to background registration correlator 150 on input lines 170 and 190, respectively. Background registration correlator 150 measures the difference between the registration of these two video signals and applies this spacial difference to frame shifter 130 along lines 210 and 230 as X and Y displacements. Since the input of frame shifter 130 on line 270 is the representation of the video image stored in frame storage device 200, the X and Y displacement shifts the image on line 270 to coincide with that on line 160 of the output of frame storage device 140. Therefore, the output of frame shifter 130 on line 250 is shifted to directly overlap that of the video signal on line 160. This video representation is then inverted by invertor 240 as with the first embodiment, the output of which is applied to frame adder 280. The rest of the process is the same as that of the first preferred embodiment to get the output on line 440.

Figure 4:
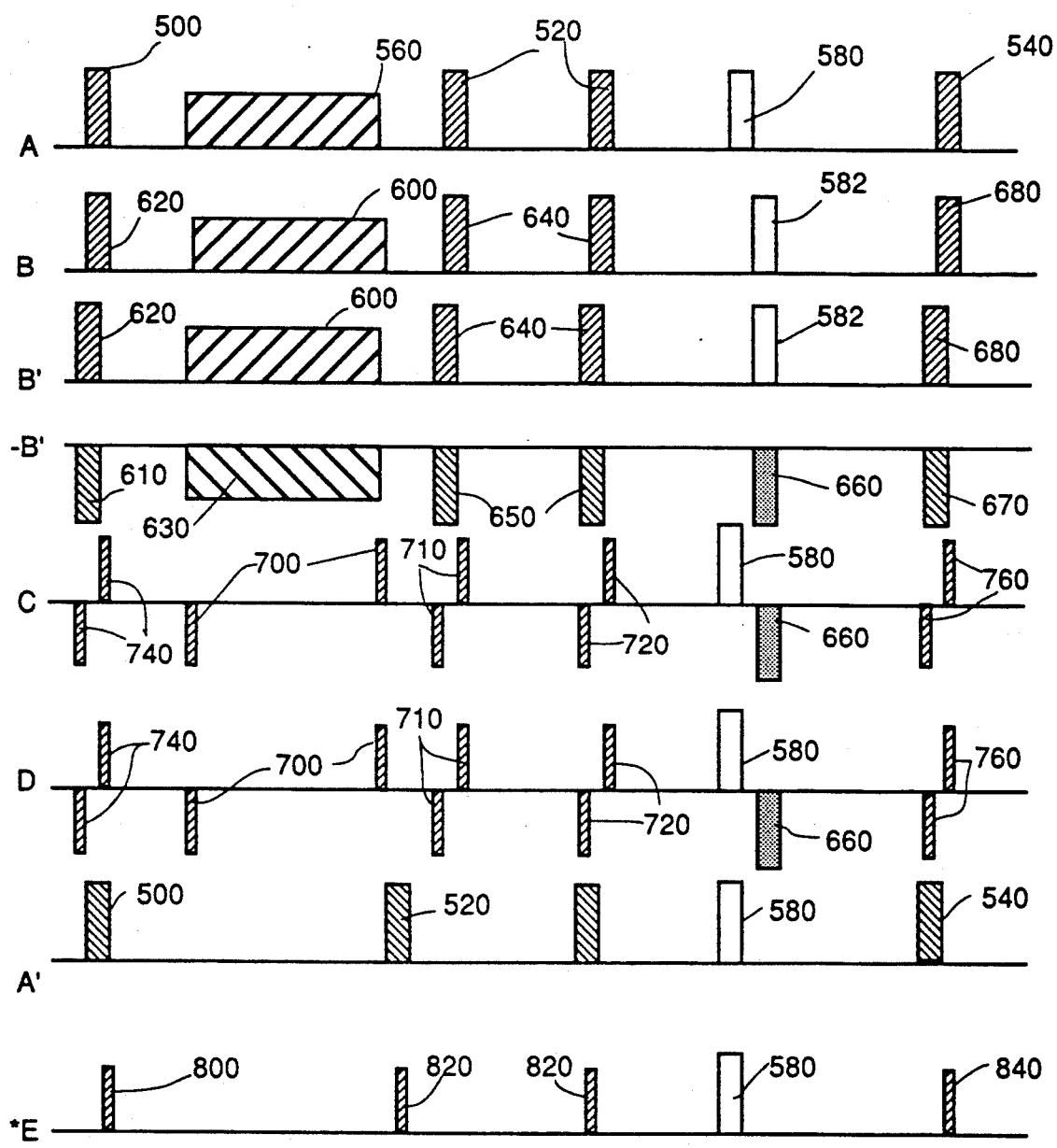
FIG. 4 is a signal diagram of certain points taken from the block diagram of the second preferred embodiment of FIG. 3.

Now turning to FIG. 4, a series of video data lines are shown at different positions of the functional block diagram of FIG. 3. Video data line A shows the same video background pattern and target as that of line A of FIG. 2. Specifically, video signals 500, 520 and 540 represent fixed noise pattern signals, video signal 560 represents the background signal and video signal 580 represents the object of interest. Video line A is representative of the output of frame storage device 140 on line 160, and is the most current video representation of the scene.

Video data line B represents the previous video scene representations taken at the output of frame storage device 200 on line 220. As can be seen the background signal 600 is not aligned with the corresponding background signal 560 of line A because of misregistration of the frames. However, the fixed noise video signals 620, 640 and 680 still align with the fixed noise pattern 500, 520 and 540, respectively from line A. The video signal 582 represents the previous location of the object of interest and therefore would be a silhouette of the target. Video data line B' represents the output of frame shifter 130 on line 250 which is the video data of line B after it has been aligned with the frame from frame storage device 140 as represented by video data line A. After the alignment, the background signal 600 is now substantially in line with the background signal 560, but the fixed noise pattern signals 620, 640 and 680 are not aligned with the fixed noise pattern signals 500, 520 and 540 of video data line A.

As was the case for the first embodiment, the frame from frame storage device 200 is inverted such that the two frames can be subtracted in frame adder 280. The inversion of the frame from frame storage device 200 after it has been aligned with the frame of frame storage device 140 is shown as video data line -B'. Video signals 610, 650 and 670 represent the direct inverse of the fixed pattern noise signals 620, 640 and 680, respectively, and video signal 630 represents the inverse of the background signal 600. Video signal 660 represents the inverse of the silhouetted object of interest from its previous location.

Once again, video data line C represents the subtraction of video data line A and video data line B at line 300 of FIG. 3. In this embodiment, there is the residual background leakage signal 700 as well as fixed pattern noise leakage 710, 720, 740 and 760 due to the misalignment of the fixed pattern noise of data lines A and -B'. Each of the leakage signals 710, 720, 740 and 760 has a positive and negative component since the leakage is a result of misalignment between a positive and negative signal.

Video data line D represents the video data after line C has been filtered by MDP filter 320. As in the first embodiment, the clutter leakage 700 would be eliminated by the MDP in a two-dimensional image, as would some of the fixed pattern noise leakage 710, 720, 740 and 760. In the present one-dimensional example, those leakages are passed by the MDP spatial filter since they are smaller than the object of interest. Thus the output from the MDP consists of the fixed pattern noise leakages 710, 720, 740, 760, the background clutter leakage 700, the object of interest 580, and the inverse of the object of interest 660.

Video data line A' is the current video representation after being filtered by MDP filter 360. As in the case of the preferred embodiment, the background 560 has been eliminated.

Figure 5:
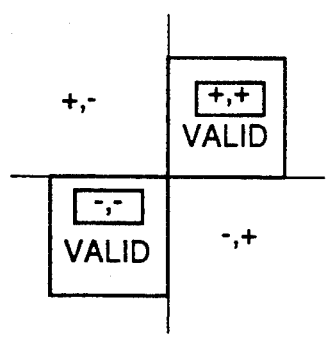
FIG. 5 is a coordinate axis showing valid outputs from either of the preferred embodiments of FIG. 1 or 3.

Video data line E represents the output of the two quadrant multiplier 400 and includes attenuated fixed pattern noise leakage signals 800, 820, and 840 and the moving object of interest 580. The attenuated leakage data signals 800, 820, and 840 represent the overlap between data points 500, 520 and 540 of video data line A' and the positive fixed pattern noise leakage video data points 740, 710, 720 and 760 of video data line D. As was the case with the first quadrant multiplier, quadrant multiplier 420 has the characteristics of only passing the data points which the two inputs have in common as can be seen in FIG. 5.

The two above described embodiments detail target acquisition systems for determining an object embedded in a cluttered background. By the first embodiment, the scene has zero line of sight rate and by the second preferred embodiment the scene is not tracked but the system realigns the scenes. By these embodiments, target acquisition can be achieved in less time, with less buffer memory and with a reduction in clutter leakage over the prior art devices.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An apparatus for detecting a moving object in a cluttered scene comprising:
   first means for storing data of a first representation of the cluttered scene;
   second means for storing data of a second representation of the cluttered scene;
   means for subtracting the first representation from the second representation to form a subtracted representation of the scene;
   a first spatial filter for filtering the subtracted representation;
   a second spatial filter for filtering the data in the first means for storing; and
   a two quadrant multiplier, said two quadrant multiplier receiving an output from said first spatial filter and an output from said second spatial filter to form an output substantially eliminating the background clutter and an ambiguous image of the object stored in the second means for storing.

2. The apparatus according to claim 1 further comprising means for aligning the data in the second storing means with the data in the first storing means.

3. The apparatus according to claim 2 wherein the means for aligning includes a background registration correlator and a frame shifter, said correlator measuring the alignment difference between the data in the first storing means and the data in the second storing means and said frame shifter altering the registration of the second stored data representation to be aligned with the first stored data representation.

4. The apparatus of claim 1 wherein the first means for storing data stores current data of the scene and the second means for storing stores previous data of the scene.

5. The apparatus according to claim 1 wherein said means for subtracting includes an invertor and a frame adder, said invertor inverting the data in the second storing means and said frame adder adding the data in the first storing means to the inverted data.

6. The apparatus according to claim 1 further comprising means for transferring the data stored in the first means for storing to the second means for storing, said transferring of data occurring at a predetermined rate.

7. The apparatus according to claim 1 wherein the first and second means for storing includes means for storing video data representations.

8. The apparatus according to claim 1 wherein the first spatial filter is a plurality of linear antimedian filters oriented in a predetermined manner with respect to each other.

9. The apparatus according to claim 1 wherein the second spatial filter is a plurality of linear antimedian filters oriented in a predetermined manner with respect to each other.

10. A method for detecting a moving object in a cluttered scene comprising the steps of:
    storing a first representation of the cluttered scene;
    storing a second representation of the cluttered scene;
    subtracting the second representation from the first representation to form a subtracted representation;
    filtering the subtracted representation through a first spatial filter;
    filtering the first representation in a second nonlinear spatial filter; and
    multiplying outputs from the first and second spatial filters in a two quadrant multiplier to detect the current image of the object and eliminate an ambiguous image of the object.

11. The method according to claim 10 further comprising the step of aligning the second representation with the first representation.

12. The method according to claim 11 wherein the step of aligning includes the steps of applying the first representation and second representation to a background registration correlator to measure the spatial displacement between the scenes and applying the spatial displacement as X and Y direction displacements to a frame shifter to reposition the second representation to be aligned with the first representation.

13. The method according to claim 10 wherein the step of storing a first representation includes storing a current image of the scene and the step of storing a second representation includes storing a past image of the scene.

14. The method according to claim 10 further comprising the step of transferring the first representation at a predetermined rate from a first location to a second location to form the second representation.

15. The method according to claim 10 wherein the first and second representations are stored as single frames of video data.

16. The method according to claim 10 wherein the step of filtering includes filtering the subtracted representation through a plurality of linear antimedian filters oriented in a predetermined manner with respect to each other.

17. The method according to claim 10 wherein the step of filtering in a second filter includes filtering the first video representation through a plurality of linear antimedian filters oriented in a predetermined manner with respect to each other.

18. A method for detecting a moving object in a cluttered scene comprising the steps of:
    storing a first frame of video data of the cluttered scene at a first time in a first frame storage device;
    transferring the first frame of video data from the first storage device to a second frame storage device at a second time;
    storing a second frame of video data of the cluttered scene in the first frame storage device substantially at the second time;
    subtracting the second frame of video data from the first frame of video data to form subtracted video data;
    filtering the subtracted video data in a first spatial filter;
    filtering the first frame of video data through a second spatial filter; and
    multiplying outputs from the first and second spatial filters in a two quadrant multiplier to detect the object and eliminate an ambiguous image of the object.

19. The method according to claim 18 further comprising the step of aligning the second frame of video data with the first frame of video data before the step of subtracting.

20. The method according to claim 19 wherein the step of aligning includes the steps of applying the first frame of video data and the second frame of video data to a background registration correlator, said background registration correlator measuring the spatial displacement between the first frame and the second frame and applying the spatial displacement as X and Y direction displacements to a frame shifter, said frame shifter repositioning the second frame of video data to be aligned with the first frame of video data.

21. The method according to claim 18 further comprising the step of setting the time between the first time and the second time at a value such that the moving object can be resolved.

22. The method according to claim 18 wherein the step of subtracting includes the steps of providing an inverse of the second frame of video data and applying this inverse along with the first frame of video data to a frame adder.

23. The method according to claim 18 wherein the step of filtering includes filtering the subtracted video data through a plurality of linear antimedian filters oriented in a predetermined manner with respect to each other.

24. The method according to claim 22 wherein the step of filtering the first frame of video data includes filtering the first frame of video data through a plurality of linear antimedian filters oriented in a predetermined manner with respect to each other.

* * * * *